United States Patent
Baba (10) Patent No.: US 8,331,702 B2
(45) Date of Patent: Dec. 11, 2012

(54) DATA COMPRESSION DEVICE AND IMAGE READING DEVICE

(75) Inventor: Masaki Baba, Osaka (JP)

(73) Assignee: Kyocera Mita Corporation (JP)

( * ) Notice: Subject to any disclaimer, the term of this patent is extended or adjusted under 35 U.S.C. 154(b) by 632 days.

(21) Appl. No.: 12/571,491

(22) Filed: Oct. 1, 2009

(65) Prior Publication Data

US 2010/0085613 A1 Apr. 8, 2010

(30) Foreign Application Priority Data

Oct. 2, 2008 (JP) .................................. 2008-257707

(51) Int. Cl.
*G06K 9/36* (2006.01)
*G06K 9/46* (2006.01)
*G06K 9/54* (2006.01)
*G06K 9/60* (2006.01)
*G06F 3/12* (2006.01)

(52) U.S. Cl. .................. 382/232; 382/305; 358/1.15

(58) Field of Classification Search .................. 382/232, 382/234, 235, 305; 358/1.15
See application file for complete search history.

(56) References Cited

U.S. PATENT DOCUMENTS

| 6,128,096 | A | * | 10/2000 | Furuya et al. | 358/1.17 |
|---|---|---|---|---|---|
| 6,348,975 | B1 | * | 2/2002 | Tsunekawa et al. | 358/1.17 |
| 6,369,910 | B1 | * | 4/2002 | Mitani | 358/1.17 |
| 6,734,989 | B2 | * | 5/2004 | Tsunekawa | 358/1.9 |
| 6,791,705 | B1 | * | 9/2004 | Sakamoto | 358/1.15 |
| 2002/0048410 | A1 | * | 4/2002 | So et al. | 382/248 |
| 2002/0066049 | A1 | * | 5/2002 | Garnett et al. | 714/5 |
| 2006/0072147 | A1 | * | 4/2006 | Kanno | 358/1.15 |

FOREIGN PATENT DOCUMENTS

JP 2000-261630 9/2000

* cited by examiner

*Primary Examiner* — Bernard Krasnic
(74) *Attorney, Agent, or Firm* — Gerald E. Hespos; Michael J. Porco (57) ABSTRACT

A data compression device includes an encoding unit that generates encoded data by compressing image data in units of a band. Encoded data storage units have addresses for storing encoded data for each band and a settings receipt unit receives start address settings in the storage units. A control unit stores the data in the storage units every time encoded data for each band is generated. A start address acquisition unit acquires the start address of an empty area where encoded data is not stored. The control unit sets the start address of an empty area in a storage unit different from the storage unit where the encoded data that is being generated is to be stored. The encoding unit then starts to generate encoded data for a next band, and stores the generated data in the storage unit indicated by the start address set in the setting receipt unit.

5 Claims, 5 Drawing Sheets

DATA COMPRESSION DEVICE AND IMAGE READING DEVICE

BACKGROUND OF THE INVENTION

1. Field of the Invention

The present invention relates to a data compression device and an image reading device.

2. Description of the Related Art

Image reading devices such as facsimile machines, image scanners, copying machines, and so on include a data compression device that generates encoded data by compressing the image data to a specific compression ratio. Also, the compression ratio of the image data varies depending on the content of the image data, so without compressing the data it is not possible to know the size of the data after compression.

Image processing devices that include this type of data compression device include a plurality of compressed page memories (hereafter referred to as page memory) (see Japanese Patent Application Publication No. 2000-261630). This type of image processing device is constituted so that the status of use of the plurality of page memories varies dynamically in accordance with the length of the encoded data.

This type of image processing device compares the data length of the encoded data obtained from compressing the image data with the empty capacity in the plurality of page memories. Then, if the data length of the encoded data is not larger than the amount of a single empty page memory, the image processing device stores the encoded data in a single page memory. On the other hand, if the data length is larger than the amount of a single page memory, the image processing device stores it in a plurality of page memories.

Figure 5:
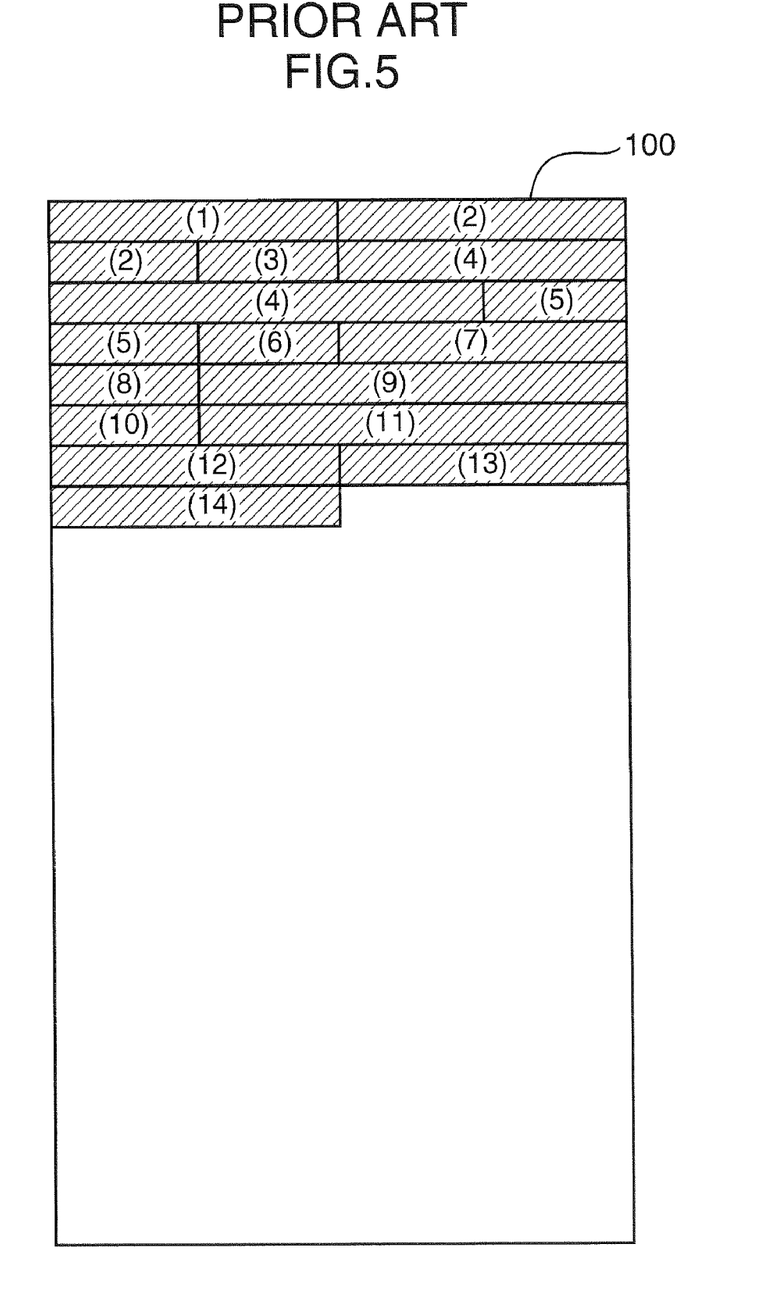
FIG. 5 is a diagram showing the storage state of encoded data in a conventional data compression device.

This type of image processing device stores as shown in FIG. 5 a plurality of bands of encoded data, for example the encoded data (1) to (14), in a continuous address of a page memory 100. The meaning of "band" is explained later. In this case the following problem arises.

In other words, when each specific band of the image data is compressed, the data length of each band of compressed encoded data varies in accordance with the data content of the image data. Therefore, the starting addresses at which that the encoded data (1) to (14) after compression should be stored in the page memory 100 can only be defined after storing the previous encoded data (1) to (14) in the page memory 100. On the other hand, execution of the compression processing by the encoding unit cannot be started if the encoding unit (or memory control unit) does not know the starting address in the page memory 100 of the data after compression. Therefore, when compression processing of one band is finished, and the starting address of the next band is defined, it is necessary to carry out encoding setting in which the starting address is set in the encoding unit (or memory control unit).

In this case time is necessary for encoding setting after completion of execution of compression processing of a certain band until the start of compression processing of the next band, and this has the problem that the compression time of image processing is increased.

SUMMARY OF THE INVENTION

It is an object of the present invention to provide a data compression device capable of reducing the compression time of image data and an image reading device that includes this data compression device.

A data compression device according to an aspect of the present invention to achieve this object includes: an encoding unit that generates encoded data by compressing image data representing an image, in units of a band that represents an image divided every predetermined number of lines in a sub scanning direction; a plurality of encoded data storage units that have addresses for storing the encoded data for each band; a settings receipt unit that receives start address of an empty area settings in the encoded data storage units in which the encoded data for each band is to be stored; a control unit that stores the encoded data successively in any of the plurality of encoded data storage units every time encoded data for each band is generated by the encoding unit; and an empty area start address acquisition unit that acquires the start address of an empty area, where encoded data is not stored for every encoded data storage unit, wherein while the encoding unit is generating encoded data for one band, the control unit sets in the setting receipt unit the start address of an empty area, where the encoded data is not stored, in an encoded data storage unit that is different from the encoded data storage unit where the encoded data that is being generated is to be stored, and when finishing generating the encoded data of the one band, the encoding unit starts to generate encoded data for a next band, and stores the generated encoded data in the encoded data storage unit indicated by the start address set in the settings receipt unit.

DETAILED DESCRIPTION OF THE PREFERRED EMBODIMENTS

The method of shortening the image data compression time in the data compression device is, for example, as follows.

Figure 4:
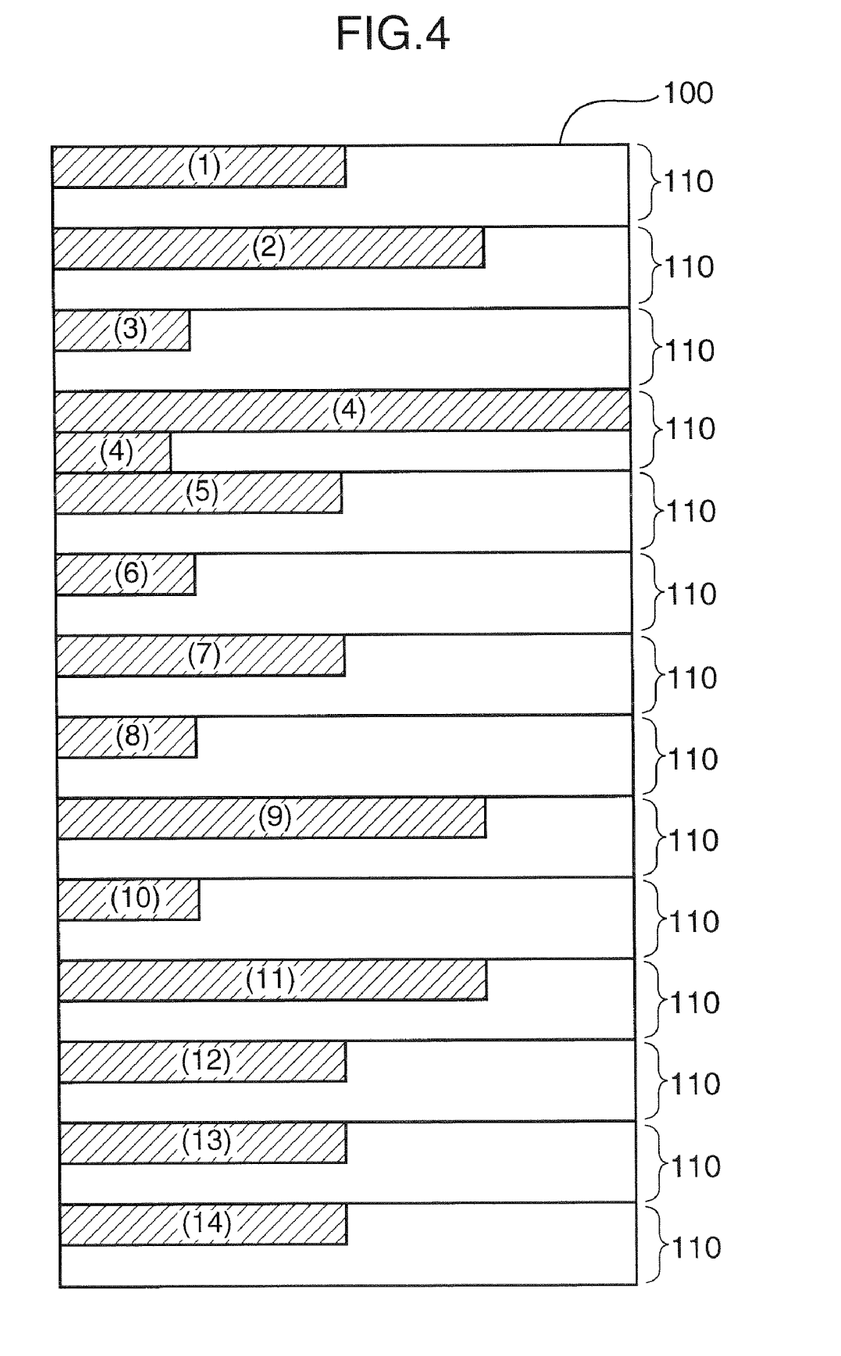
FIG. 4 is a diagram for explaining a reference example of a method for shortening the image data compression time.

FIG. 4 is a diagram for explaining a reference example of a method for shortening the image data compression time.

A plurality of storage areas 110 . . . is provided in advance in a page memory 100. Each storage area 110 . . . corresponds to a band, which is described later, and encoded data (1) to (14) corresponding to each band is stored in each storage area 110 . . . . Here, "band" is 1 unit representing a specific number of lines of the image in the sub scanning scan direction, as explained later.

As shown in FIG. 4, a plurality of storage areas 110 corresponding to each band is provided in the page memory 100, so the starting address in the page memory 100 where the encoded data of the next band should be stored is known even if the time for generating the encoded data of one band has not finished. However, according to this method the storage areas are determined in advance in accordance with the bands. Therefore if the quantity of data of the encoded data does not fill the storage area capacity, gaps are produced in the storage areas, and this produces the problem that it is not possible to effectively use the storage areas of the page memory 100. The present invention was devised to solve this problem.

The following is an explanation of the data compression device and image reading device according to an embodiment of the present invention.

Figure 1:
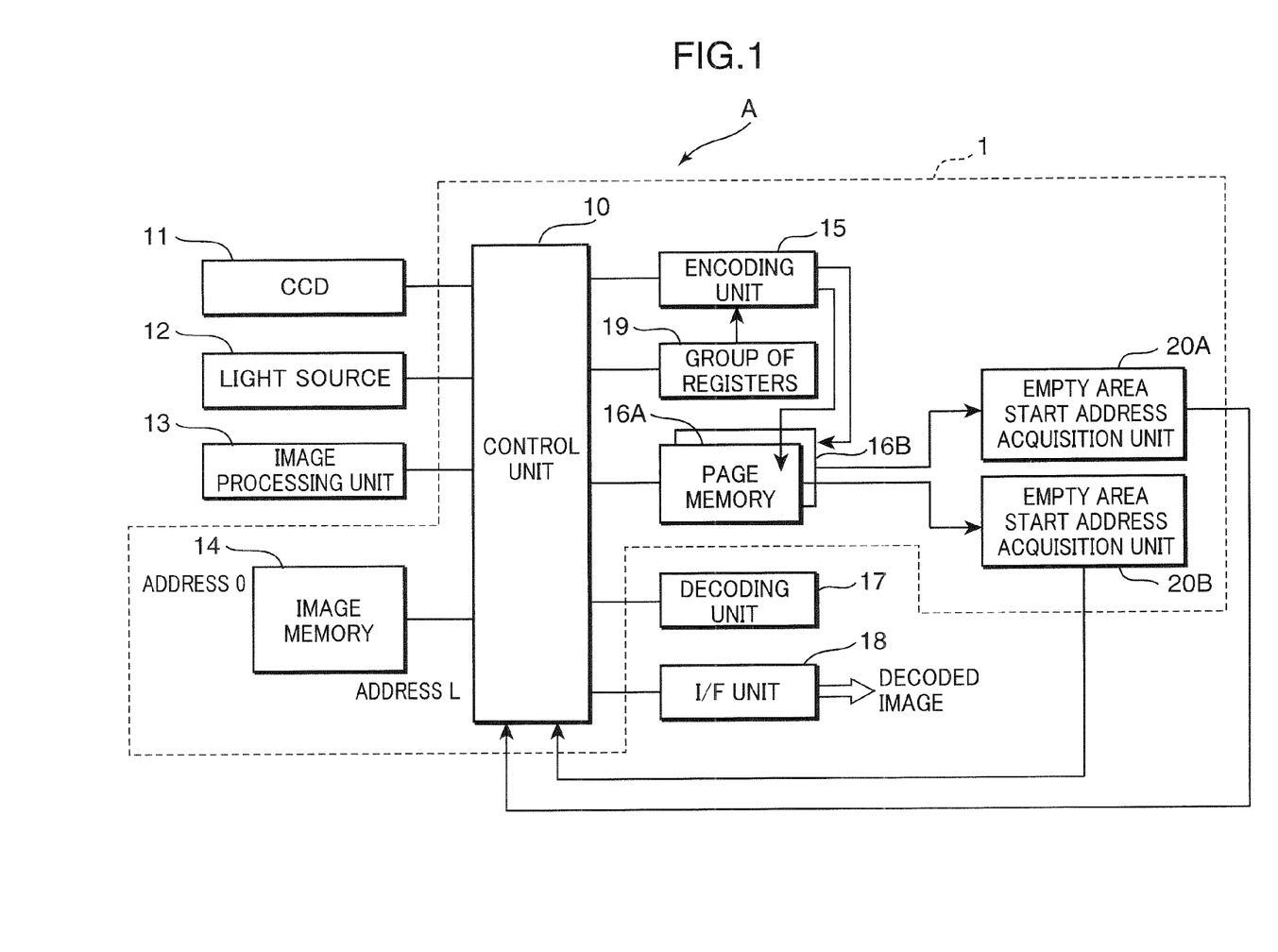
FIG. 1 is a block diagram showing an example of the functional constitution of a data compression device and image reading device according to an embodiment of the present invention.

FIG. 1 is a block diagram showing an example of the functional constitution of a data compression device and image reading device according to an embodiment of the present invention.

An image reading device A shown in FIG. 1 includes a control unit 10, a CCD (image reading unit) 11, a light source 12, an image processing unit 13, an image memory (image data storage unit) 14, an encoding unit 15, page memories (encoded data storage unit) 16A and 16B, a decoding unit 17, an interface (I/F) unit 18, a group of registers (settings receipt unit) 19, and empty area start address acquisition units 20A and 20B.

In this image reading device A, a data compression device 1 includes the control unit 10, the image memory 14, the encoding unit 15, the page memories 16A and 16B, the group of registers 19, and the empty area start address acquisition units 20A and 20B.

In the data compression device 1 shown in FIG. 1, the control unit 10 includes a central processing unit (CPU) and so on, and controls the data compression device 1 and image reading device A by transmitting control signals via a control bus (for example, a CPU bus) and transmitting data via a data bus.

Light emitted from the light source 12 is reflected by the source document, and the reflected light is received by the charge coupled device (CCD) 11 to generate image data. The generated image data is input to the image processing unit 13 for image processing. The light emitted from the illumination light source 12 is reflected off the source document and received by the CCD 11.

The image processing unit 13 has line memory or the like, and carries out image processing such as shading, masking, gamma correction, edge emphasis, smoothing, color conversion, and so on, on the image data, and stores the image data in the image memory 14.

The image memory 14 has a plurality of addresses from number [0] to [L], for storing pixel units of the image processed image data (unencoded image data). The encoding unit 15 compresses the image data stored in the image memory 14 to a specific compression ratio for each band, which is described later, to generate encoded data. The page memories 16A and 16B store the encoded data at the start address specified by the encoding unit 15.

The decoding unit 17 decodes the encoded data. The interface 18 outputs the decoded image data (decoded image) to an external device as the final output. The group of registers 19 receives the settings for the start address where the encoding unit 15 should store the encoded data in the page memories 16A and 16B, the start address of the image memory 14 in which the image data is stored before becoming encoded data, and the data length of the image data before becoming encoded data.

The empty area start address acquisition unit 20A is provided corresponding to the page memory 16A, and it acquires the start address of the empty area where encoded data is not stored in the page memory 16A. Also, the empty area start address acquisition unit 20B is provided corresponding to the page memory 16B, and it acquires the start address of the empty area where encoded data is not stored in the page memory 16B.

Figure 2:
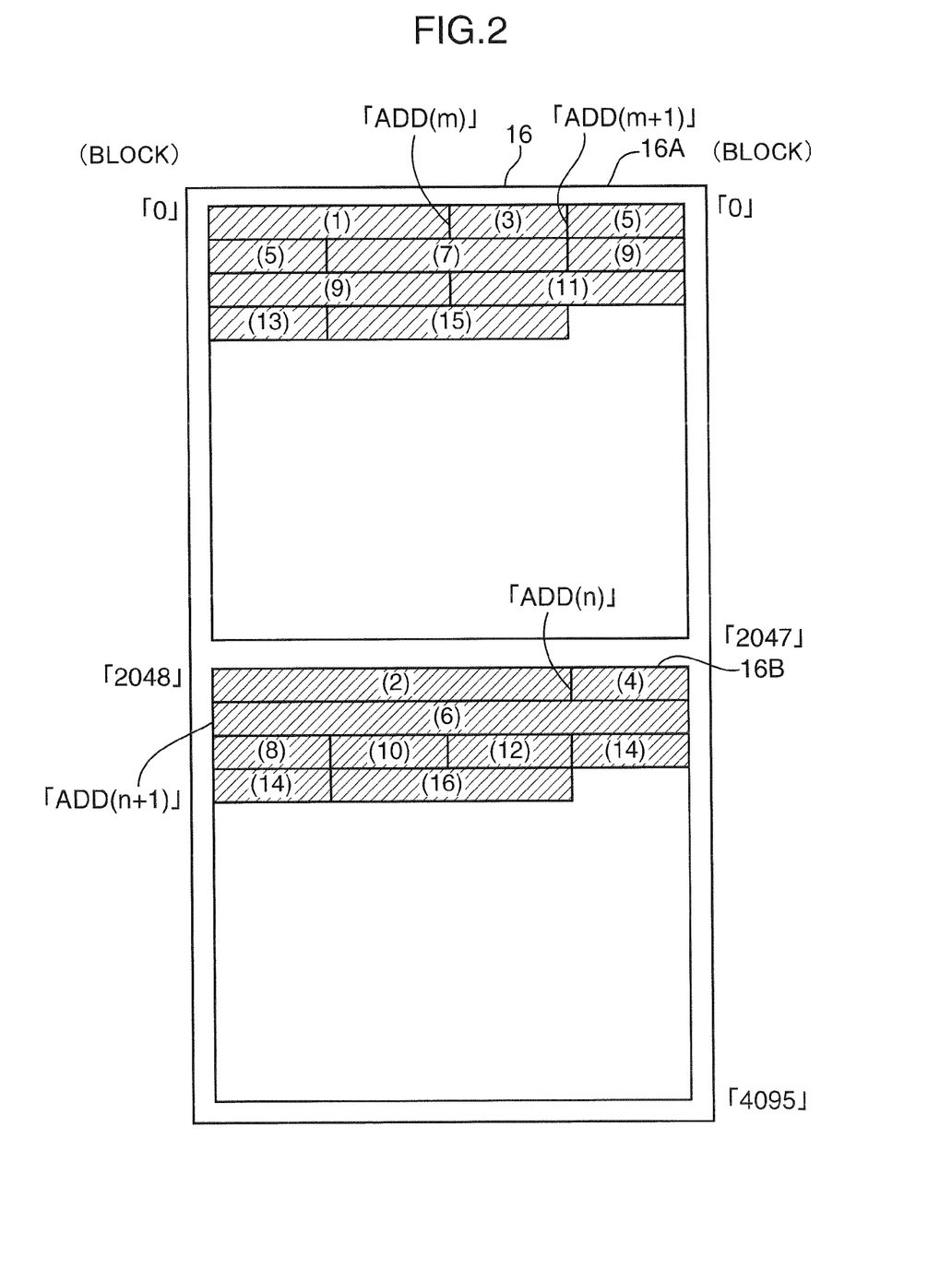
FIG. 2 is a diagram showing an example of the constitution of the page memory and encoded data in the stored state.

FIG. 2 is a diagram showing an example of the constitution of the page memory and encoded data in the stored state. The page memories 16A and 16B shown in FIG. 2 are constituted as a single page memory partitioned. Also, the page memories 16A and 16B in the present embodiment each have a storage capacity of 2 kilobytes. However, the storage capacities of the page memories 16A and 16B are not limited to 2 kilobytes.

The page memory 16A shown in FIG. 2 has block numbers [0] to [2047], where a block is the minimum data unit in which the encoded data is stored, so it has a total of 2048 blocks. Also, the page memory 16B shown in FIG. 2 has block numbers [2048] to [4095], where a block is the minimum data unit in which the encoded data is stored, so it has a total of 2048 blocks.

In this way, the page memory 16 is partitioned into the page memory 16A and the page memory 16B, so the control unit 10 outputs address signals containing 11 bits, to specify the writing address and the reading address of images in the page memory 16, and to specify the block number where the encoded data should be stored and the block number from which the encoded data is read in pixel units. In this way, if the image writing address and the read out address in the page memory 16 are specified, the page memory 16 is partitioned into the page memories 16A and 16B.

Figure 3:
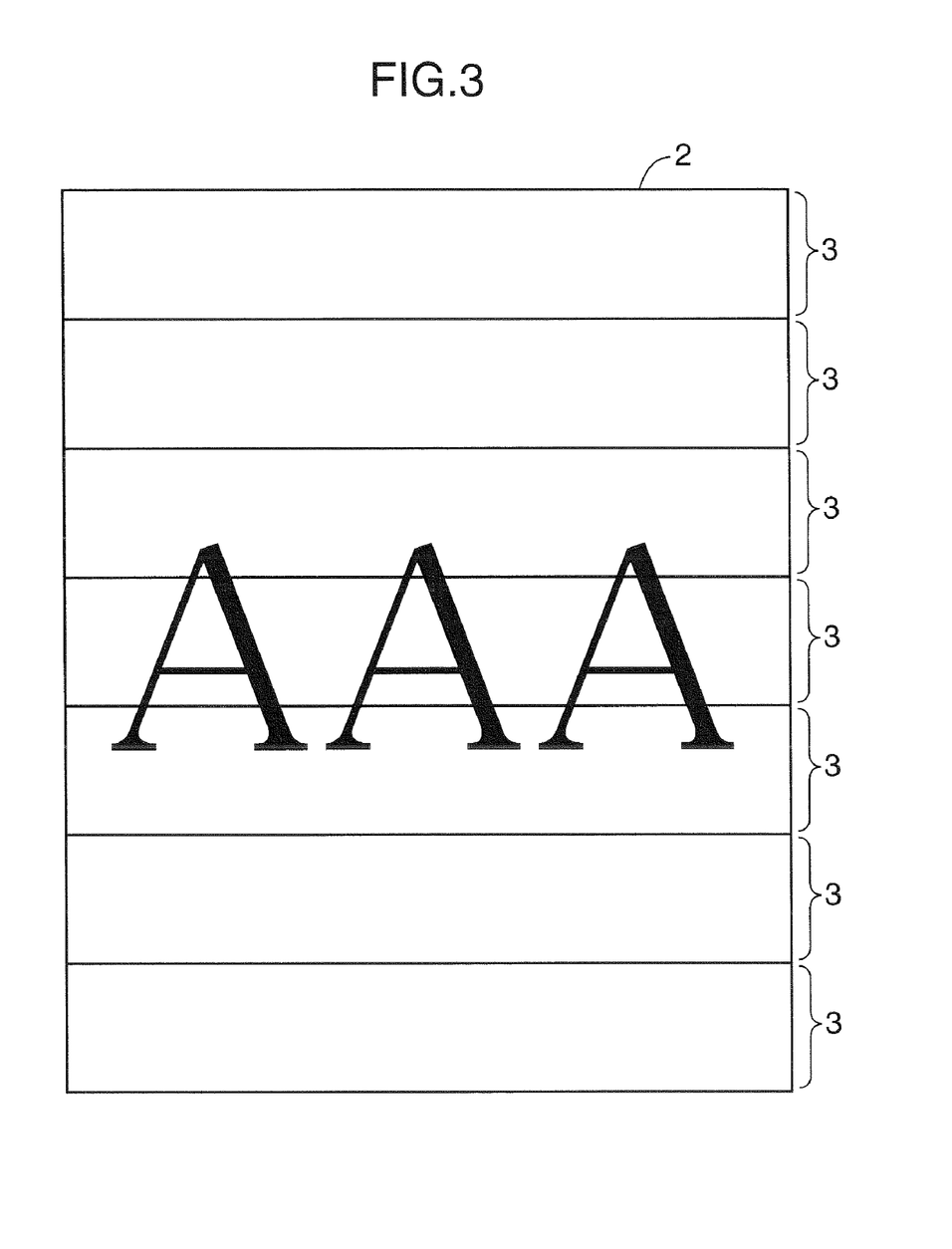
FIG. 3 is a diagram for explaining the meaning of bands.

FIG. 3 is a diagram for explaining the meaning of bands. FIG. 3 shows the image data 2 for one page of a document that is not encoded. If this image data 2 is divided in the sub scanning direction into a specific number of lines, a plurality of subdivided image data 3 is obtained. Each of the plurality of subdivided image data 3 is a "band".

In the data compression device 1, the encoded data (1) to (16) that is generated when the image data is successively encoded in band units is stored alternately in the page memories 16A and 16B. In other words, as shown in FIG. 2, the encoded data (1), (3), (5), (7), (9), (11), (13), and (15) is stored continuously in the page memory 16A. Also, the encoded data (2), (4), (6), (8), (10), (12), (14), and (16) is stored continuously in the page memory 16B.

The following is an outline explanation of the process executed by the data compression device 1 according to the present embodiment. The data compression device 1 repeatedly carries out the series of processes "empty area start address acquisition process"→"setting process"→"compression process and storage process", to compress each band of image data and generate encoded data, and carry out the process of storing it in each of the page memories 16A and 16B.

[Empty Area Start Address Acquisition Process]

In the data compression device 1, the empty area start address acquisition units 20A and 20B obtain the start addresses of the empty areas in which encoded data is not stored in the page memories 16A and 16B. The method of obtaining the start addresses of the empty areas can be, for example, by taking the address obtained by adding the data length of the most recent encoded data to the start address of the most recent encoded data stored in each of the page memories 16A and 16B to be the address of the empty area.

[Setting Process]

Next, to allow the encoding unit 15 to generate the encoded data, the control unit 10 carries out the following setting (encoding setting) process for the group of registers 19. Namely, the start address of the empty area in each of the each of page memories 16A and 16B where the encoded data is to be stored, the start address of the image data before being encoded into encoded data in the image memory 14, and the data length of the image data are set in the group of registers 19. The reason for carrying out this setting process is as follows.

[The Start Address of the Empty Area in Each of the Page Memories 16a and 16b Where the Encoded Data is to be Stored]

For the encoding unit 15 to generate the encoded data, it is necessary to know the start address of the empty area in each of page memories 16A and 16B where the encoded data is to be stored.

[The Start Address of the Image Data in the Image Before being Encoded into Encoded Data]

The image memory 14 has a plurality of blocks (from block [0] to block [L]; see FIG. 1) that are defined in advance, the same as the page memories 16A and 16B. The unencoded image data is stored in pixel units using any of the plurality of block numbers as the start address. In order for the encoding unit 15 to read out the image data stored in the image memory 14 with one of the plurality of block numbers as the start address in this way, it is necessary that the encoding unit 15 knows the start address where the image data is stored.

[Data Length of the Image Data]

In order for the encoding unit 15 to read out the image data stored in the image memory 14 in band units, it is necessary to know the data length of the image data in addition to the start address of the image data in the image memory 14.

This setting process is carried out as follows. Namely, while the encoding unit 15 is generating encoded data, the control unit 10 sets in the group of registers 19 the start address of the empty area obtained by each of the empty area start address acquisition units 20A and 20B as the start address of the empty area in each of the page memories 16A and 16B where the next encoded data is to be stored. Also, the start address in the image memory 14 of the image data before it was encoded into encoded data and the data length of the image data are set in the group of registers 19 at the same time.

At this time, one band of image data that is to be encoded is specified with the start address and data length in the image memory 14. The one band of image data that is specified in this way is read out as follows. For example, the encoding unit 15 reads out the number of pixels of image data corresponding to the data length set in the group of registers 19 from among image data stored in the image memory 14, using the start address set in the group of registers 19 as the starting point.

[Compression Process and Storage Process]

Next, the compression process and the process of storage in each of the page memories 16A and 16B are carried out by the encoding unit 15. Namely, the encoding unit 15 reads out the data described above that has been set in the group of registers 19. From among the data that was read out, the encoding unit 15 reads out one band of image data from the image memory 14 in accordance with the start address in the image memory 14 where the image data was stored before encoding into encoded data, and the data length of the image data. Then, the encoding unit 15 compresses the one band worth of image data that was read out to generate the encoded data.

Then, the encoding unit 15 stores the encoded data in any of the page memories 16A and 16B in accordance with the start address of empty area of each of the page memories 16A and 16B where the encoded data is to be stored, from among the data read out from the group of registers 19.

Next, an outline of the process carried out by the data compression device 1 according to the present embodiment is explained in detail using FIG. 1 and FIG. 2.

[Generation of Encoded Data (1)]

At the time that the control unit 10 sets the start address of empty area in the group of registers 19 in order to allow the encoding unit 15 to generate the encoded data (1), the encoding unit 15 has not started any compression process. Therefore, encoded data is not stored in either of the page memories 16A or 16B. Therefore, the empty area addresses obtained by the empty area start address acquisition units 20A and 20B are [0] and [2048]. Therefore the control unit 10 obtains the start addresses of the empty areas [0] and [2048].

Then, the control unit 10 sets the start address of the empty area [0] in the group of registers 19. At the same time the control unit 10 determines the start address and data length in the image memory 14 for the first band of image data in the image memory 14, and sets the start address and data length in the group of registers 19.

Then, the encoding unit 15 reads this data that is set in the group of registers 19, compresses the first band of image data and generates the encoded data (1), and stores the encoded data (1) in the storage area with the starting point at the start address of the empty area [0] read from the group of registers 19.

[Generation of the Encoded Data (2)]

At the time that the control unit 10 sets the start address of the empty area in the group of registers 19 in order to allow the encoding unit 15 to generate the encoded data (2), the encoding unit 15 is generating the encoded data (1). Therefore the encoded data (1) is not yet stored in either of the page memories 16A and 16B, so the empty area addresses obtained by the empty area start address acquisition units 20A and 20B are [0] and [2048]. Therefore, the control unit 10 obtains the start addresses of the empty areas [0] and [2048].

Then, to store the encoded data (2) in the page memory 16B which is different from the page memory 16A where the encoded data (1) is to be stored, the control unit 10 sets the start address of the empty area [2048] in the group of registers 19 while the encoding unit 15 is generating the encoded data (1).

At this time, in order to store the encoded data (2) in the page memory 16B which is different from the page memory 16A where the encoded data (1) is to be stored, the process by which the control unit 10 sets the start address of the empty area [2048] can be the following process. For example, the control unit 10 determines the start address (the start address of the empty area) set in the group of registers 19 before generation of the encoded data (2).

Also, at this time the start address (the start address of the empty area) [0] is set in the group of registers 19, so the control unit 10 determines that the start address (the start address of the empty area) apart from this start address (the start address of the empty area) is the start address of empty area [2048]. Then the control unit 10 sets the start address [2048] in the group of registers 19 for generation of the encoded data (2).

At the same time the control unit 10 determines the start address and data length of the second band of image data in the image memory 14, and sets the start address and data length in the group of registers 19.

On the other hand, when the encoding unit 15 has finished generating the encoded data (1), the encoding unit 15 stores it at the storage areas whose start address is the address [0] in the page memory 16A. Also, the encoding unit 15 reads this data that is set in the group of registers 19, and starts to generate the encoded data (2).

[Generation of the Encoded Data (3)]

At the time that the control unit 10 sets the start address of the empty area in the group of registers 19 in order to allow the encoding unit 15 to generate the encoded data (3), the encoding unit 15 is generating the encoded data (2). Therefore, because the encoded data (2) is not yet stored in either of the page memories 16A and 16B, the start address of the empty area obtained by the empty area start address acquisition units 20A and 20B are [ADD(m)] and [2048]. Therefore the control unit 10 obtains the start address of the empty area [ADD(m)] and [2048].

At this time, in the page memory 16A, the start address of the empty area [ADD(m)] obtained by the control unit 10 is the address obtained by adding the data length of the encoded data (1) to the start address [0] in the page memory 16A of the latest encoded data (1) stored at the time setting the start address of empty area in order to allow the encoding unit 15 to generate the encoded data (3).

Then, to store the encoded data (3) in the page memory 16A which is different from the page memory 16B where the encoded data (2) is to be stored, the control unit 10 sets the start address of the empty area [ADD(m)] in the group of registers 19 while the encoding unit 15 is generating the encoded data (2).

At this time, in order to store the encoded data (3) in the page memory 16A which is different from the page memory 16B where the encoded data (2) is to be stored, the process by which the control unit 10 sets the start address of the empty area [ADD(m)] can be the following process. For example, the control unit 10 determines the start address set in the group of registers 19 before generation of the encoded data (3).

Also, at this time the start address (the start address of the empty area) [2048] is set in the group of registers 19, so the control unit 10 determines that the start address (the start address of the empty area) apart from this start address (the start address of the empty area) is the start address of the empty area [ADD(m)]. Then the control unit 10 sets the start address [ADD(m)] in the group of registers 19 for generation of the encoded data (3).

At the same time the control unit 10 determines the start address and data length of the third band of image data in the image memory 14, and sets the start address and data length in the group of registers 19.

On the other hand, when the encoding unit 15 has finished generating the encoded data (2), and stores it at the storage areas whose start address is the address [2048] in the page memory 16B. Also, the encoding unit 15 reads this data that is set in the group of registers 19, and starts to generate the encoded data (3).

[Generation of the Encoded Data (4)]

At the time that the control unit 10 sets the start address of the empty area in the group of registers 19 in order to allow the encoding unit 15 to generate the encoded data (4), the encoding unit 15 is generating the encoded data (3). Therefore the encoded data (3) is not yet stored in either of the page memories 16A and 16B, so the start addresses of the empty areas obtained by the empty area start address acquisition units 20A and 20B are [ADD(m)] and [ADD(n)]. Therefore the control unit 10 obtains the start addresses of the empty areas [ADD(m)] and [ADD(n)].

At this time, in the page memory 16B the start address of the empty area [ADD(n)] obtained by the control unit 10 is the address obtained by adding the data length of the encoded data (2) to the start address [2048] in the page memory 16B of the latest encoded data (2) stored at the time setting the start address of empty area in order to allow the encoding unit 15 to generate the encoded data (4).

Then, to store the encoded data (4) in the page memory 16B which is different from the page memory 16A where the encoded data (3) is to be stored, the control unit 10 sets the start address of empty area [ADD(n)] in the group of registers 19 while the encoding unit 15 is generating the encoded data (3).

At this time, in order to store the encoded data (4) in the page memory 16B which is different from the page memory 16A where the encoded data (3) is to be stored, the process by which the control unit 10 sets the start address of the empty area [ADD(n)] can be the following process. For example, the control unit 10 determines the start address set in the group of registers 19 before start of generation of the encoded data (4).

Also, at this time the start address (the start address of the empty area) [ADD(m)] is set in the group of registers 19, so the control unit 10 determines that the start address (the start address of the empty area) apart from this start address (the start address of the empty area) is the start address of the empty area [ADD(n)]. Then the control unit 10 sets the start address [ADD(n)] in the group of registers 19 for generation of the encoded data (4).

At the same time the control unit 10 determines the start address and data length of the fourth band of image data in the image memory 14, and sets the start address and data length in the group of registers 19.

On the other hand, when the encoding unit 15 has finished generating the encoded data (3), and stores it at the storage areas whose start address is the address [ADD(m)] in the page memory 16A. Also, the encoding unit 15 reads this data that is set in the group of registers 19, and starts to generate the encoded data (4).

[Generation and Storing the Encoded Data (5), (7), (9), (11), (13), and (15)]

In order to simplify the explanation for each of the encoded data (5), (7), (9), (11), (13), and (15), they are referred to as the encoded data (2N+1) (where N is a natural number equal to or greater than 2, and equal to or less than 7; likewise below).

At the time that the control unit 10 sets the start address of the empty area in the group of registers 19 in order to allow the encoding unit 15 to generate the encoded data (2N+1), the encoding unit 15 is generating the encoded data (2N) (where N is a natural number equal to or greater than 2, and equal to or less than 7; likewise below). Therefore, because the encoded data (2N) is not yet stored in either of the page memories 16A and 16B, the start addresses of the empty areas obtained by the empty area start address acquisition units 20A and 20B are [ADD(m+1)] and [ADD(n)]. Therefore the control unit 10 obtains the start addresses of the empty areas [ADD(m+1)] and [ADD(n)].

At this time, in the page memory 16A the start address of the empty area [ADD(m+1)] obtained by the control unit 10 is the address obtained by adding the data length of the encoded data (2N−1) (where N is a natural number equal to or greater than 2, and equal to or less than 7; likewise below) to the start address [ADD(m)] in the page memory 16B of the latest encoded data (2N−1) stored at the time setting the start address of empty area in order to allow the encoding unit 15 to generate the encoded data (2N+1).

Then, to store the encoded data (2N+1) in the page memory 16A which is different from the page memory 16B where the encoded data (2N) is to be stored, the control unit 10 sets the start address of empty area [ADD(m+1)] in the group of registers 19 while the encoding unit 15 is generating the encoded data (2N). At the same time the control unit 10 determines the start address and data length of the (2N+1) the band of image data in the image memory 14, and sets the start address and data length in the group of registers 19.

On the other hand, when the encoding unit 15 has finished generating the encoded data (2N), and stores it at the storage areas whose start address is the address [ADD(n)] in the page memory 16B. Also, the encoding unit 15 reads this data that is set in the group of registers 19, and starts to generate the encoded data (2N+1).

[Generation and Storing the Encoded Data (6), (8), (10), (12), and (14), and (16)]

In order to simplify the explanation for each of the encoded data (6), (8), (10), (12), and (14), and (16), they are referred to as the encoded data (2N) (where N is a natural number equal to or greater than 3, and equal to or less than 8; likewise below).

At the time that the control unit 10 sets the start address of the empty area in the group of registers 19 in order to allow the encoding unit 15 to generate the encoded data (2N), the encoding unit 15 is generating the encoded data (2N−1) (where N is a natural number equal to or greater than 3, and equal to or less than 8; likewise below). Therefore the encoded data (2N−1) is not yet stored in either of the page memories 16A and 16B, so the addresses of the empty areas obtained by the empty area start address acquisition units 20A and 20B are [ADD(m+1)] and [ADD(n+1)]. Therefore the control unit 10 obtains the addressed of the empty areas [ADD(m+1)] and [ADD(n+1)].

At this time, in the page memory 16B the start address of the empty area [ADD(n+1)] obtained by the control unit 10 is the address obtained by adding the data length of the encoded data (2N−2) (where N is a natural number equal to or greater than 3, and equal to or less than 8; likewise below) to the start address [ADD(n)] in the page memory 16B of the latest encoded data (2N−2) stored at the time setting the start address of empty area in order to allow the encoding unit 15 to generate the encoded data (2N).

Then, to store the encoded data (2N) in the page memory 16B which is different from the page memory 16A where the encoded data (2N−1) is to be stored (where N is a natural number equal to or greater than 3, and equal to or less than 8; likewise below), the control unit 10 sets the start address of the empty area [ADD(n+1)] in the group of registers 19 while the encoding unit 15 is generating the encoded data (2N−1). At the same time the control unit 10 determines the start address and data length of the 2Nth band of image data in the image memory 14, and sets the start address and data length in the group of registers 19.

On the other hand, when the encoding unit 15 has finished generating the encoded data (2N−1), and stores it at the storage areas whose start address is the address [ADD(m+1)] in the page memory 16B. Also, the encoding unit 15 reads this data that is set in the group of registers 19, and starts to generate the encoded data (2N).

In this way, in the data compression device 1, while the encoding unit 15 is generating each of the encoded data (1) to (15), the start address s of the empty areas in the page memories 16B and 16A, which are different from those of the page memories 16A and 16B where the encoded data (1) to (15) being generated is to be stored, are set in the group of registers 19 as the start addresses of the empty areas where each of the encoded data (2) to (16) which are due to be generated next by the encoding unit 15 will be stored. Therefore, while each of the encoded data (1) to (15) are being generated, it is possible for the encoding unit 15 to know the start address of the empty area where the encoded data (2) to (16) that will be generated next will be stored. Therefore, when generation of each of the encoded data (1) to (15) is finished, it is possible to immediately start generation of each of the next band of encoded data (2) to (16). Therefore, it is possible to shorten the compression time of the image data.

In the present embodiment, the data compression device 1 may store each of the encoded data (2), (4), (6), (8), (10), (12), and (14), and (16) generated from the image data of the even numbered bands in the page memory 16A, and each of the encoded data (1), (3), (5), (7), (9), (11), and (13), and (15) generated from the image data of the uneven numbered bands may be stored in the page memory 16B. In this case the start address of the empty area in the page memories 16A and 16B where the encoded data (1) should be stored is the address [2048], and the start address of the empty area in the page memories 16A and 16B where the encoded data (2) should be stored is the address [0].

Also, the data compression device 1 may use a page memory partitioned into three or more page memories, and each of the encoded data (1) to (16) are stored in rotation in the plurality of page memories.

Also, the page memories 16A and 16B may be provided as independent memories. Also, three or more page memories may be provided as independent memories.

The specific embodiment as described above mainly includes the invention having the following constitution.

A data compression device according to an aspect of the present invention comprises: an encoding unit that generates encoded data by compressing image data representing an image, in units of a band that represents an image divided every predetermined number of lines in a sub scanning scan direction; a plurality of encoded data storage units that have addresses for storing the encoded data for each band; a settings receipt unit that receives start address of an empty area settings in the encoded data storage units in which the encoded data for each band is to be stored; a control unit that stores the encoded data successively in any of the plurality of encoded data storage units every time encoded data for each band is generated by the encoding unit; and an empty area start address acquisition unit that acquires the start address of an empty area, where encoded data is not stored for every encoded data storage unit, wherein while the encoding unit is generating encoded data for one band, the control unit sets in the setting receipt unit the start address of an empty area, where the encoded data is not stored, in the encoded data storage unit that is different from the encoded data storage unit where the encoded data that is being generated is to be stored, and when finishing generating the encoded data of the one band, the encoding unit starts to generate encoded data for a next band, and stores the generated encoded data in the encoded data storage unit indicated by the start address set in the settings receipt unit.

According to this constitution, while the encoding unit is generating the encoded data, the start address of the empty area in an encoded data storage unit that is different from the encoded data storage area where the encoded data that is being generated is to be stored is set in the settings receipt unit as the start address of the empty area in the encoded data storage unit where the next encoded data that is due to be generated by the encoding unit is to be stored. Therefore while the encoding unit is generating encoded data, the encoding unit can know the start address of the empty area in the encoded data storage unit where the encoded data that will be generated next is to be stored. Therefore, when generating the encoded data has been finished, it is possible to promptly start generating the encoded data for the next band. Therefore, it is possible to shorten the compression time of the image data.

In the above constitution, preferably the control unit sets in the settings receipt unit a start address of the empty area, from among the start addresses of an empty areas of the plurality of encoded data storage units acquired by the empty area address acquisition unit, other than the start address of the empty area set in the settings receipt unit as the start address of the empty area where the encoded data that is being generated by the encoding unit is to be stored.

According to this constitution, a start address of the empty area other than the start address of the empty area set in the settings receipt unit as the start address of the empty area where the encoded data that is being generated by the encoding unit will be stored is set in the settings receipt unit.

Therefore, it is possible to realize the process of setting in the settings receipt unit the start address of the empty area where encoded data is not stored in an encoded data storage unit that is different from the encoded data storage unit where the encoded data that is being generated is to be stored while the encoding unit is generating encoded data for one band.

In the above constitution, preferably a first and a second encoded data storage units are provided as the plurality of encoded data storage units.

According to this constitution, after the encoded data generated by the encoding unit has been stored in one of the encoded data storage units, the encoded data that is generated next is stored in the other encoded data storage unit. Therefore, it is possible to alternately store the encoded data for each band in the two encoded data storage units.

In the above constitution, preferably an image data storage unit having a plurality of addresses at which image data is stored in pixel units is further provided, wherein the settings receipt unit is constituted to further receive the settings of the start address of an image data in the image data storage unit and a data length of the image data, and the control unit further sets in the settings receipt unit the start address of the image data in the image data storage unit and the data length of the image data while the encoding unit is generating the encoded data for one band, and when finishing generating the encoded data for the one band, the encoding unit reads image data for the number of pixels corresponding to the data length set in the settings receipt unit from among the image data stored in the image data storage unit, with the start address that is set in the settings receipt unit as the starting point, and compresses the number of pixels of the image data that has been read, thereby generating the encoding data for the next band.

According to this constitution, when the encoding unit has finished generating the encoded data for one band, the encoding unit reads out the next band of image data, from among the image data stored in the image data storage unit, by reading out the image data whose number of pixels corresponds to the data length set in the settings receipt unit, using the start address set in the setting receipt unit as the starting point. And the encoding unit compresses it.

Therefore, when the encoding unit has finished generating one band of encoded data, the encoding unit can smoothly read the image data for one band of image data that is to be the next encoded data to be generated, so the image data compression time is further reduced.

In the above constitution, preferably the empty area start address acquisition unit obtains as the start address of the empty area the address obtained by adding the data length of the most recently encoded data to the start address of the most recently encoded data stored in each of the plurality of encoded data storage units.

According to this constitution, the start address of the empty area is obtained by adding the data length of the most recently encoded data to the start address where the most recently encoded data is stored, so the empty area address can be smoothly obtained.

In the above constitution, preferably an image data storage unit having a plurality of addresses at which the image data is stored in pixel units is further provided, wherein the empty area start address acquisition unit obtains as the start address of the empty area, where the encoded data is not stored, in each of the plurality of encoded data storage units, the address obtained by adding the data length of the most recently encoded data to the start address of the most recently encoded data stored in each of the encoded data storage units, while the encoding unit is generating encoded data for one band, the control unit sets in the settings receipt unit a start address, from among the start addresses of the empty areas of the plurality of encoded data storage units obtained by the empty area address acquisition unit, other than the start address of the empty area set in the settings receipt unit as the start address of the empty area where the encoded data being generated is to be stored, and at the same time, sets in the settings receipt unit the start address of the empty area in the image data storage unit and the data length of the image data stored, and when finishing generating the encoded data for the one band, the encoding unit reads image data for the number of pixels corresponding to the data length set in the settings receipt unit from among the image data stored in the image data storage unit, with the start address that is set in the settings receipt unit as the starting point, starts to compress the number of pixels of the image data that has been read, and stores the generated encoding data in the encoded data storage unit indicated by the start address set in the settings receipt unit.

According to this constitution, a start address of the empty area other than the start address of the empty area set in the settings receipt unit as the start address of the empty area where the encoded data that is being generated by the encoding unit will be stored is set in the settings receipt unit. Therefore, it is possible to realize the process of setting in the settings receipt unit the start address of the empty area where encoded data is not stored in an encoded data storage unit that is different from the encoded data storage unit where the encoded data that is being generated is to be stored while the encoding unit is generating encoded data for one band.

Moreover, when the encoding unit has finished generating the encoded data for one band, the encoding unit reads out the next band of image data, from among the image data stored in the image data storage unit, by reading out the image data whose number of pixels corresponds to the data length set in the settings receipt unit, using the start address set in the setting receipt unit as the starting point. And the encoding unit compresses it.

Therefore, when the encoding unit has finished generating one band of encoded data, the encoding unit can smoothly read the image data for one band of image data that is to be the next encoded data to be generated, so the image data compression time is further reduced.

Moreover, the start address of the empty area is obtained by adding the data length of the most recently encoded data to the start address where the most recently encoded data is stored, so the empty area address can be smoothly obtained.

Also, an image reading device according to another aspect of the present invention comprises: an image reading unit that reads image data from a document; and a data compression device; including an encoding unit that generates encoded data by compressing image data read by the image reading unit, in units of a band that represents an image divided every predetermined number of lines in a sub scanning scan direction; a plurality of encoded data storage units that have addresses for storing the encoded data for each band; a settings receipt unit that receives start address of an empty area settings in the encoded data storage units in which the encoded data for each band is to be stored; a control unit that stores the encoded data successively in any of the plurality of encoded data storage units every time encoded data for each band is generated by the encoding unit; and an empty area start address acquisition unit that acquires the start address of an empty area, where encoded data is not stored for every encoded data storage unit, wherein while the encoding unit is generating encoded data for one band, the control unit sets in the setting receipt unit the start address of an empty area, where the encoded data is not stored, in the encoded data storage unit that is different from the encoded data storage unit where the encoded data that is being generated is to be stored, and when finishing generating the encoded data of the one band, the encoding unit starts to generate encoded data for a next band, and stores the generated encoded data in the encoded data storage unit indicated by the start address set in the settings receipt unit.

According to this constitution, while the encoding unit is generating the encoded data, the start address of the empty area in an encoded data storage unit that is different from the encoded data storage area where the encoded data that is being generated is to be stored is set in the settings receipt unit as the start address of the empty area in the encoded data storage unit where the next encoded data that is due to be generated by the encoding unit is to be stored. Therefore while the encoding unit is generating encoded data, the encoding unit can know the start address of the empty area in the encoded data storage unit where the encoded data that will be generated next is to be stored. Therefore, when generating the encoded data has been finished, it is possible to promptly start generating the encoded data for the next band. Therefore, it is possible to shorten the compression time of the image data.

This application is based on Japanese patent application serial No. 2008-257707, filed in Japan Patent Office on Oct. 2, 2008, the contents of which is hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A data compression device, comprising:
   an encoding unit that generates encoded data by compressing image data representing the image, in units of a band that represents an image divided every predetermined number of lines in a sub scanning direction;
   an image data storage unit having a plurality of addresses at which the image data is stored in pixel units;
   a plurality of encoded data storage units that have addresses for storing the encoded data for each band;
   a setting receipt unit that receives start address of an empty area settings in the encoded data storage units in which the encoded data for each band is to be stored, the setting receipt unit is constituted to further receive the settings of the start address of an image data in the image data storage unit and a data length of the image data;
   a control unit that stores the encoded data successively in any of the plurality of encoded data storage units every time encoded data for each band is generated by the encoding unit;
   an empty area start address acquisition unit that acquires the start address of an empty area, where the encoded data is not stored for every encoded data storage unit, and
   wherein
   while the encoding unit is generating encoded data for one band, the control unit sets in the setting receipt unit the start address of an empty area, where the encoded data is not stored, in an encoded data storage unit that is different from the encoded data storage unit where the encoded data that is being generated is to be stored and further sets in the setting receipt unit the start address of the image data in the image data storage unit and the data length of the image data while the encoding unit is generating the encoded data for the one band, and
   when finishing generating the encoded data of the one band, the encoding unit starts to generate encoded data for a next band, and stores the generated encoded data in the encoded data storage unit indicated by the start address set in the setting receipt unit, reads image data for a number of pixels corresponding to the data length set in the setting receipt unit from among the image data stored in the image data storage unit with the start address that is set in the setting receipt unit as the starting point, and compresses the number of pixels of the image data that has been read.

2. The data compression device according to claim 1, wherein
   the control unit sets in the settings receipt unit a start address of the empty area, from among the start addresses of the empty areas of the plurality of encoded data storage units acquired by the empty area address acquisition unit, other than the start address of the empty area set in the settings receipt unit as the start address of the empty area where the encoded data that is being generated by the encoding unit is to be stored.

3. The data compression device according to claim 1, wherein
   a first and a second encoded data storage units are provided as the plurality of encoded data storage units.

4. The data compression device according to claim 1, wherein
   the empty area start address acquisition unit obtains as the start address of the empty area the address obtained by adding a data length of most recently encoded data to the start address of the most recently encoded data stored in each of the plurality of encoded data storage units.

5. An image reading device, comprising:
   an image reading unit that reads image data from a document; and
   a data compression device, including:
   an encoding unit that generates encoded data by compressing image data read by the image reading unit, in units of a band that represents an image divided every predetermined number of lines in a sub scanning direction;
   an image data storage unit having a plurality of addresses at which the image data is stored in pixel units;
   a plurality of encoded data storage units that have addresses for storing the encoded data for each band;
   a setting receipt unit that receives start address of an empty area settings in the encoded data storage units in which the encoded data for each band is to be stored, the setting receipt unit is constituted to further receive the settings of the start address of an image data in the image data storage unit and a data length of the image data;
   a control unit that stores the encoded data successively in any of the plurality of encoded data storage units every time encoded data for each band is generated by the encoding unit;
   an empty area start address acquisition unit that acquires the start address of an empty area, where the encoded data is not stored for every encoded data storage unit, and
   wherein
   while the encoding unit is generating encoded data for one band, the control unit sets in the setting receipt unit the start address of an empty area, where the encoded data is not stored, in an encoded data storage unit that is different from the encoded data storage unit where the encoded data that is being generated is to be stored and further sets in the setting receipt unit the start address of the image data in the image data storage unit and the data length of the image data while the encoding unit is generating the encoded data for the one band, and when finishing generating the encoded data of the one band, the encoding unit starts to generate encoded data for a next band, and stores the generated encoded data in the encoded data storage unit indicated by the start address set in the setting receipt unit, reads image data for a number of pixels corresponding to the data length set in the setting receipt unit from among the image data stored in the image data storage unit with the start address that is set in the setting receipt unit as the starting point, and compresses the number of pixels of the image data that has been read.

* * * * *